J. F. LINCOLN.
ELECTRIC SWITCH.
APPLICATION FILED SEPT. 4, 1915.
1,234,678.
Patented July 24, 1917.
2 SHEETS—SHEET 1.
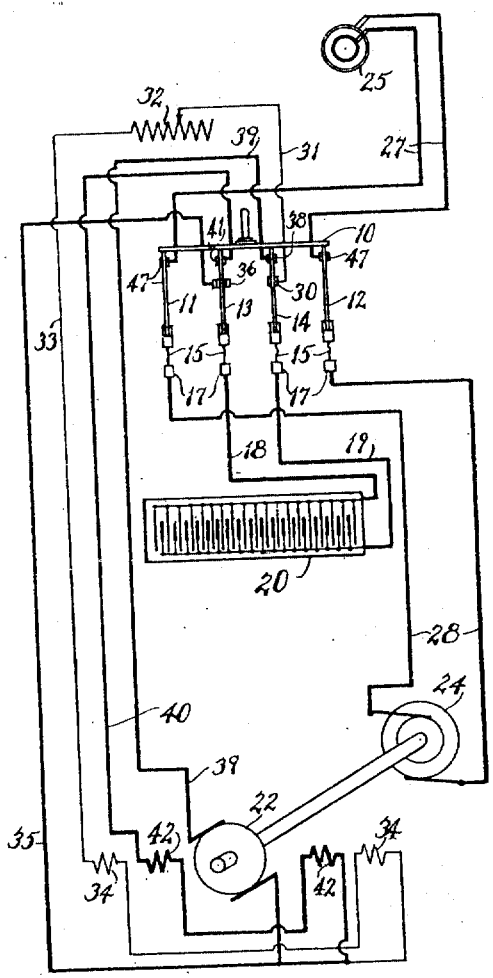
FIG. 1.
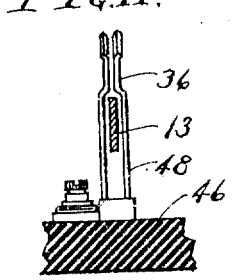
FIG. 11.
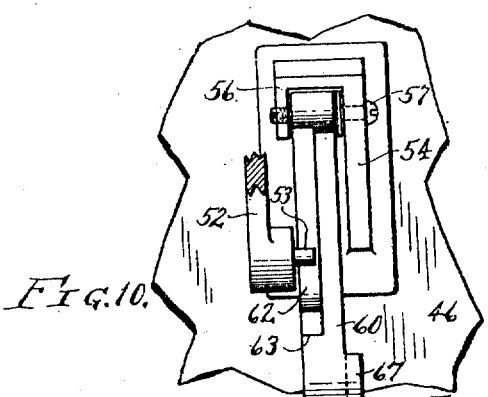
INVENTOR,
James F. Lincoln,
BY Albert H. Bates
ATTY J. F. LINCOLN.
ELECTRIC SWITCH.
APPLICATION FILED SEPT. 4, 1915.
1,234,678.
Patented July 24, 1917.
2 SHEETS—SHEET 2.
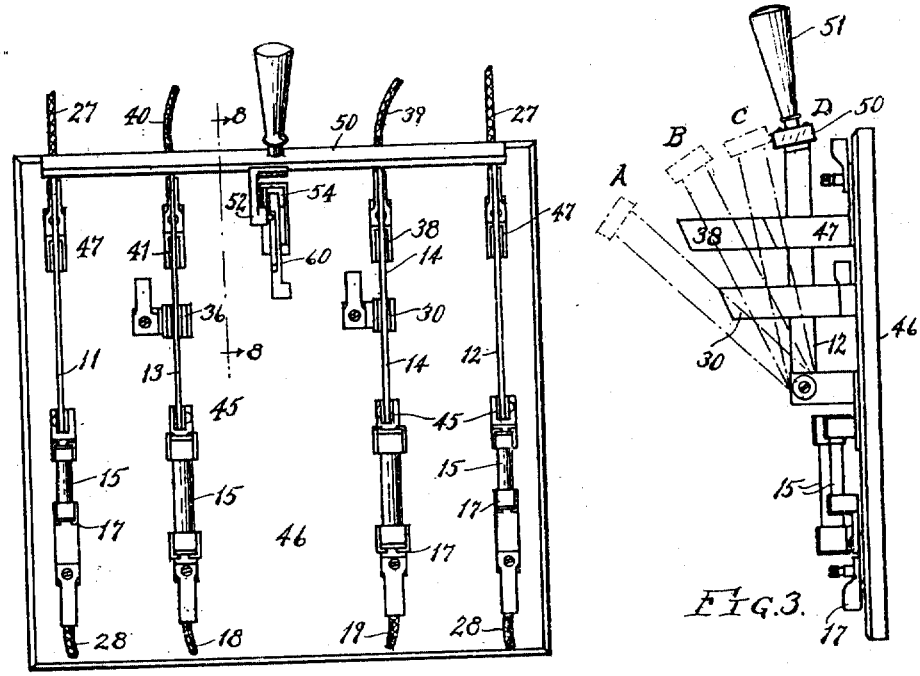
FIG. 2.
FIG. 3.
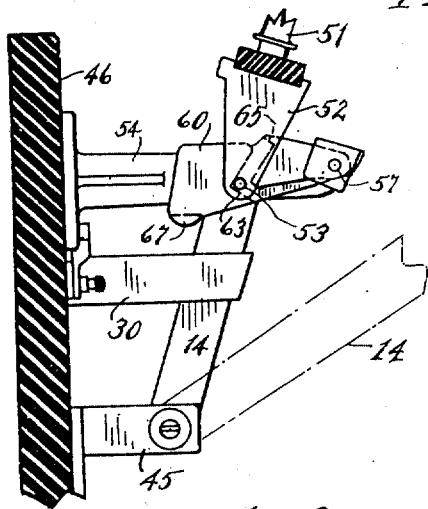
FIG. 8.
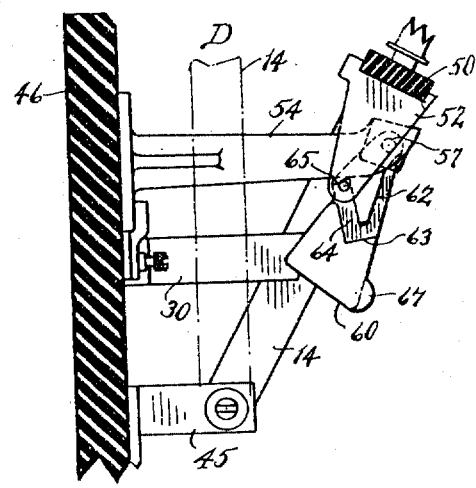
FIG. 9.
INVENTOR
James F. Lincoln,
BY Albert H. Baker,
ATT'Y

UNITED STATES PATENT OFFICE.

JAMES F. LINCOLN, OF EAST CLEVELAND, OHIO, ASSIGNOR TO THE LINCOLN ELECTRIC COMPANY, OF CLEVELAND, OHIO, A CORPORATION OF OHIO.

ELECTRIC SWITCH.

1,234,678. Specification of Letters Patent. Patented July 24, 1917.

Application filed September 4, 1915. Serial No. 48,955.

*To all whom it may concern:*

Be it known that I, JAMES F. LINCOLN, a citizen of the United States, residing at East Cleveland, in the county of Cuyahoga and State of Ohio, have invented a certain new and useful Improvement in Electric Switches, of which the following is a full, clear, and exact description, reference being had to the accompanying drawings.

The object of this invention is to provide a simple and efficient device for retarding the movement of a hand operated electric switch, to insure the continuance of engagement between certain terminals for a time interval sufficient to enable the proper operation of the apparatus thereby controlled.

In the embodiment shown herein, my invention is particularly adapted for use with a hand operated switch controlling a storage battery system, in which a motor-generator set is employed for charging the storage batteries by power derived from alternating current, and it is desired to use the generator as a motor driven by residual current for a sufficient time to speed up the A. C. motor.

A storage battery charging system such as just referred to, is shown, described and claimed in my pending application No. 862,600, for charging system for storage batteries, filed September 19, 1914. In such a system it is desirable to have a multi-pole switch manually operated to start the charging by one closing movement. This closing movement if performed too rapidly does not allow the residual current in the battery to supply the compound-wound generator for a sufficient length of time to enable it to bring the motor up to speed.

In accomplishing the retardation desired, I provide a delay or retarding latch associated with the movable members of the switch and adapted to stop its closing movement when in engagement with a particular contact and require a slight return movement to release the latch and allow the closing movement to be completed. I prefer to arrange the retarding latch so that it may limit the outward movement described to prevent the particular contact being broken by such return movement, whereby the stopping of the movable member, the return and stopping on the return, and the beginning of the forward closing movement may all take place while the circuit or circuits are closed through particular terminals.

My invention is hereinafter more fully described in connection with the drawings, which show the same as embodied in a controlling device for such a system, and the essential characteristics of the invention are set out in the claims.

In the drawings, Figure 1 is a wiring diagram showing the multi-pole controlling switch and the arrangement of circuits in a charging system illustrating the use of my invention; Fig. 2 is a front elevation of the switch proper; Fig. 3 is a side elevation of the switch, indicating in broken lines four successive positions of the switch blade, in each of which different circuits are closed; Figs. 4 to 7 inclusive are diagrams indicating the four sets of connections successively made by the blades of the main switch, as it is moved into position to begin the charging, each of these sets of connections corresponding respectively to the positions of the switch as shown in Fig. 3; Fig. 8 is a vertical cross section on an enlarged scale on the line 8—8 of Fig. 2, showing the retarding latch mechanism for delaying the movement of the switch; Fig. 9 is a similar section on the same scale as Fig. 8, showing the retarding latch in another position, but the switch blades still in contact with the same terminal members; Fig. 10 is a detail in front elevation of the retarding latch, this figure being drawn on a still larger scale: Fig. 11 is a detail of one of the terminals of the switch.

As heretofore stated, my invention provides a retarding device for a hand operated switch so arranged that the closing movement of the switch is delayed at some particular position in its travel. As the invention is particularly well adapted for use with a multi-pole switch and a battery charging system, it is so shown in the drawings above referred to, and can be best understood after a description of the switch proper and the connections therefrom.

Referring first to the general arrangement of circuits of the charging system with which my present invention is shown as used; in the diagram in Fig. 1, 10 indicates a main switch having the usual yoke bar of insulating material carried on the ends of four switch blades 11, 12, 13 and 14, each pivoted at its lower ends to suitable connections to which lead fuses 15 each extending to suitable binding posts 17. Leading from the posts 17 connected to the blades 13 and 14, are battery wires 18 and 19 connected with a storage battery indicated at 20. 22 indicates a compound-wound generator directly connected with an alternating current motor 24. This motor is shown as connected with a source of alternating current 25 through wires 27, switch blades 11 and 12, and wires 28.

Referring now to the connections and circuits for the compound-wound generator; leading from the terminal 30 adapted to engage the blade 14 of the main switch, is a line 31 leading to a variable resistance indicated at 32, then through a line 33, through the shunt windings 34 and the line 35 back to a terminal 36 engaging the switch blade 13. When the blades 13 and 14 are in engagement with the terminals 30 and 36, current from the battery may flow through the lines 18 and 19 and the circuits just described, through the shunt field of the generator. Connected with a terminal 38 adapted to engage the switch blade 14, is a line 39, leading through the armature of the generator 22 and through the line 35 to the terminal 36. The series winding of the generator is in circuit with a line 40 leading from a terminal 41 engaging the switch blade 13, through field windings 42 and line 35. Thus the series field and line 35 are in parallel from the battery line 18 and the blade 13 and line 35 form a bridge or shunt across the series field when the connection at 36 is closed.

By means of the circuits described I start the apparatus by first passing current through the shunt field of the generator alone to saturate that field and enable a low battery current to start the armature; second, through the shunt field and armature together, thereby rotating the generator as a motor, by means of the residual current in the battery 20. When the armature reaches substantially its normal speed, I pass (third) the alternating current through the motor 24, changing the direct current machine to a shunt wound generator, beginning the charging. Finally (fourth), I cut out the bridge across the series field, converting the generator to a compound-wound machine. To most simply accomplish these four steps in starting, I have so arranged the multi-pole switch that as it is moved inwardly it connects the circuits successively in the manner just referred to and hereinafter more fully described.

The terminals 45 carrying the switch blades are suitably mounted on a switch board or base 46 of slate or like material, carrying the terminals 17, heretofore mentioned, and also carrying the terminals 30, 36, 38 and 41, described. The terminals 47 to which the wires 27 are secured, are adapted to engage the blades 11 and 12 and are also mounted on the base 46. The terminals 45 and 17 are provided with suitable clips for receiving the fuse cartridges.

In order that the circuits of my system will be closed in their proper order as the switch is moved inwardly toward the base to start the charging operation, I construct the terminals 30 and 36 of such a height that the switch blades 13 and 14 first contact at their intermediate points with these terminals when the switch is brought to the position indicated in broken lines at A in Fig. 3. As the switch blades swing inwardly these blades 13 and 14 next (second) engage the terminals 38 and 41, when in the position shown in broken lines at B in Fig. 3. In the third position indicated in broken lines at C, the switch still engages each of the terminals mentioned and also the terminals 47 of the alternating current line. The last portion of the movement of the switch brings it to the fourth position shown in solid lines at D in Fig. 3. The blades of the switch are now each in engagement with their respective terminals with the exception of the terminal 36 which has its contact members separated at 48 adjacent the base 46 so that they may be out of contact with the blade 13 when the switch is in its final position. (See Fig. 11.)

Now as the switch is moved inwardly to start the charging, the circuits of my system are connected in the following order. (Refer to Figs. 4 to 7 inclusive in connection with Fig. 3). The blades 13 and 14 first engage the terminals 30 and 36 (position A), closing the circuit from the battery 20, through the wires 18 and 19, through the wire 31, resistance 32, shunt windings 34 and wire 35, saturating the shunt field of the generator; on a further movement of the switch the blades 13 and 14 engage the terminals 38 and 41 (position B), directing a portion of the residual current through the armature of the generator, passing through the wires 39 and 35, thereby temporarily running the generator as a motor and starting the motor 24, bringing the same substantially to its normal speed. Further movement of the switch connects the blades 11 and 12 with terminals 47 (position C), thereby directing alternating current through the motor 24. A further movement of the switch to position D brings the blade into the separated portion 48 (Fig. 11), of the contacts of the terminal 36, thereby breaking the contact at this point and leaving connections formed as shown diagrammatically in Fig. 7, in which the motor is being driven by an alternating current and the generator 22 is acting as a compound-wound machine, and is so connected with the battery as to charge the same.

If the alternating current is too suddenly directed through the A. C. motor, it subjects the motor and the fuses in the circuits to more than full load, usually resulting in burning out fuses or otherwise injuring the apparatus. Accordingly, the necessity for leaving the switch in position B where it forms connections through the generator and causes the same to act as a D. C. motor until the motor generator set has been brought to speed, at once becomes apparent. The purpose of my present invention is to provide such a time interval, preventing a controlling switch being moved from one position to another too quickly. My invention will now be described in the form shown, as adapted for the switch above described.

Mounted on the yoke bar 50, which carries a suitable handle 51, is a depending arm 52 having a laterally extending lug or pin 53. Mounted on the base 46 is a horizontally projecting bracket arm 54, having a U-shaped portion 56 at its outer end adapted to receive a screw 57 which may serve as a pivot pin for the retarding latch member 60. The latch 60 normally depends from its pivot pin in a position to be engaged by the pin 53.

On the adjacent face of the latch 60 is a zigzag groove adapted to engage the pin 53 to arrest the movement of the switch arms and necessitate a slight return movement before releasing the pin and allowing the closing movement of the switch to be completed. On the inward movement of the switch arm the pin 53 first engages a shoulder 62, which swings the latch inwardly, the pin moving along this shoulder until it engages a shoulder 63 formed on the lower side of the first arm of the zigzag groove. The movement of the pin along this portion of the groove is limited when the pin engages the inner side of a return portion 64 of the groove, in which position it is shown in Fig. 8. It will be seen that the inward movement of the switch is arrested at this point and it is necessary to move the switch outwardly a short distance, bringing the pin 53 to a shoulder formed by an inwardly extending portion 65 of the groove, where its outward movement is arrested and in which position it is shown in Fig. 9. It will be noted that the latch tends to drop by gravity as the switch is moved outwardly from the position shown in Fig. 9, insuring the pin 53 engaging the groove 64. The return movement of the switch from the position shown in Fig. 8 to the position shown in Fig. 9, just described, is not sufficient to allow the switch blades 13 and 14 to move out of the position B and break the contacts with the terminals 30, 36, 38 and 41. The switch may be now moved inwardly, the pin passing out of the portion 65 of the groove, allowing the closing movement of the switch to be continued.

On the outward or opening movement of the switch, the pin 53 engages the side of the latch and swings the same outwardly, and as the shoulder 65 now underhangs the opening of the adjacent groove, the pin 53 is prevented from engaging the groove, and accordingly moves freely along the entire inner edge of the latch, the latch swinging upwardly and outwardly and allowing the same to pass. Thus the opening movement of the switch is uninterrupted and may be made as quickly as is desired. A projection 67 on the latch member prevents it swinging upwardly past the bracket, and the portion 56 of the bracket carrying the latch limits its outward and upward swinging movement. Accordingly, the latch always returns to position to be engaged by the projection 53.

It will be seen that, by the use of this device, the normal closing movement of the switch is arrested, reminding the operator that a time interval is desired with the switch in that position and necessitating a slight return or outward movement to a point where the switch is again stopped, before the closing movement can be completed. The sudden reminding of a careless operator that a rest or time interval at this point is desirable insures a careful operation, but the latch is protective in any instance because the time required in the stopping of the switch, making the slight return movement and again moving forwardly, is sufficient to bring the motor generator set substantially up to a speed at which it is safe for the alternating current circuit to be closed through the A. C. motor. Thus my invention prevents subjecting the motor to excess current, and serves to protect the fuses in the circuits.

While I have shown a retarding device as combined with a multi-pole switch and a series wound motor generator, it is to be understood that the retarding device is useful with any other forms of hand operated switches. In general, therefore, I do not intend to limit myself to any particular combination with the retarding device further than the appended claims and the prior art require.

Having thus described my invention, what I claim is:

1. In a switch, the combination of a pivoted blade having open, intermediate and final positions, means controlled by the movement of said blade from open position toward final position for stopping the blade in its intermediate position while permitting it a backward movement, means for stopping the blade on such backward movement while permitting it a forward movement into its final position, and means enabling the opening movement of the blade without encountering such backward stop.

2. The combination, with a hand operated switch having a movable member and a plurality of contacts adapted to engage the movable member when in different positions, of means for stopping the closing movement of the movable member while it is in engagement with one of the contacts and necessitating a slight return movement before the closing movement can be completed, means for limiting said return movement while the movable member is still in engagement with the same contact, and means for moving the limiting means to inactive position after the blade has moved inward therefrom.

3. The combination, with a hand operated switch having a movable member and a plurality of contacts adapted to engage the movable member when it is in different positions, of a latch mechanism adapted to stop the closing movement of the switch when in engagement with one of the contacts and necessitate a slight return movement before the movable member can proceed, means for stopping said return movement while the movable member is in engagement with the same contact, and means for removing the backward stop on the opening movement of the blade.

4. The combination, with a hand operated switch having a movable member, of a latch mechanism comprising a pivoted member, a means carried by the movable member and adapted to coöperate with the pivoted member, said pivoted member having thereon at least two separated stops, and a guide between the stops so arranged that the means carried by the pivoted member may engage one of said stops to arrest the movement of the movable member in one direction and necessitate a return movement, said latch tending by gravity to cause said means to engage said guide, whereby the means on the movable member is caused to engage the second stop on the return movement, said second stop being so arranged that further movement of the switch in the original direction will release said means from the latch.

5. The combination, with a hand operated switch having a movable member, of a latch mechanism comprising a pivoted member, means coöperating therewith and carried by the movable member, a pair of separated stops on the pivoted member, a guide between the stops, one of said stops being adapted to engage said means to arrest one movement of the switch, the guide directing said means to the second stop on a return movement from the first stop, the second stop being arranged to be released from said means on the further in movement of the movable member.

6. The combination, with a hand operated switch having a movable blade and contact means adapted to engage the same in different positions, of a pivoted latch member, a member carried by the switch blade, a projection on one of said members, a coöperating groove on the other adapted to engage the projection, said groove extending across this member in an offset path, and means for moving the latch to idle position after the blade has passed it.

7. In a hand operated switch, the combination of a base member, a plurality of contacts projecting outwardly therefrom, a pivoted switch blade adapted to engage said contacts when in different positions, a latch, means mounted on the base for pivotally carrying the latch, the latch having a zigzag groove in one face, a member rigid with the switch blade having a projection engaging said groove whereby the inward movement of the switch blade must be stopped in contact with one of the members necessitating a return movement to release the pin from the groove whereupon it may be moved to the next contact.

8. The combination, with a movable switch blade, of a projection movable therewith, two movable stops, means for moving one stop into the path of said projection on the inward movement of the blade, and means for moving the other stop into the path of said projection on the succeeding outward movement of the blade, the first-mentioned stop being out of the path of said projection on the subsequent inward movement of the blade.

9. The combination, with a movable switch blade, of a latch having two stops, a projection movable with the blade, means for guiding the projection against one of the stops on the inward movement of the blade, means for guiding the projection against the other stop on the succeeding outward movement of the blade, the projection clearing the first mentioned stop on the succeeding inward movement of the blade, and a contact which said blade engages throughout the time the projection is moving from the first stop to the second.

10. The combination, with a hand operated switch having a movable member, of contact means adapted to engage the movable member in different positions, means for arresting the forward movement of the movable member and necessitating a slight return movement before the forward movement is completed, and means for stopping the movable member on said return movement and adapted to permit the forward movement to be continued.

11. The combination, with a hand operated switch having a movable switch blade and contact means adapted to engage the same in different positions, of a latch member, a member carried by the switch blade, a projection on one of said members and a tortuous groove on the other, which said projection must follow in the closing movement of the switch blade, said latch member being pivoted and adapted to hang in position to be engaged by the other of said members, and means for causing the latch member to swing freely out of the path of the other member to permit an uninterrupted movement in the other direction.

12. In a switch, the combination, with a contact, of a pivoted blade, a pivoted latch having an angulous groove, a pin carried by the blade and adapted to pass through the groove when the blade travels inwardly with an intermediate retrograde movement, and means for moving the latch to idle position after the blade has passed it.

13. In a switch, the combination of a pivoted blade having open, intermediate and final positions, a movable latch moved by the movement of said blade from open position toward final position for stopping the blade in its intermediate position while permitting it a backward movement, means whereby said latch is moved while the blade is on such backward movement to stop the blade while permitting it a forward movement into its final position, and means for moving the latch to idle position after the blade has passed it.

14. In a switch, the combination of a pivoted blade having open, intermediate and final positions, a pivoted gravity latch adapted to be raised into stopping position by the movement of said blade from open position to its intermediate position while permitting said blade a backward movement, means on the latch for stopping the blade on its backward movement while permitting it a forward movement into its final position, and means for moving the latch to idle position after the blade has passed it.

In testimony whereof, I hereunto affix my signature.

JAMES F. LINCOLN.

Copies of this patent may be obtained for five cents each, by addressing the "Commissioner of Patents, Washington, D. C."